UNITED STATES PATENT OFFICE.

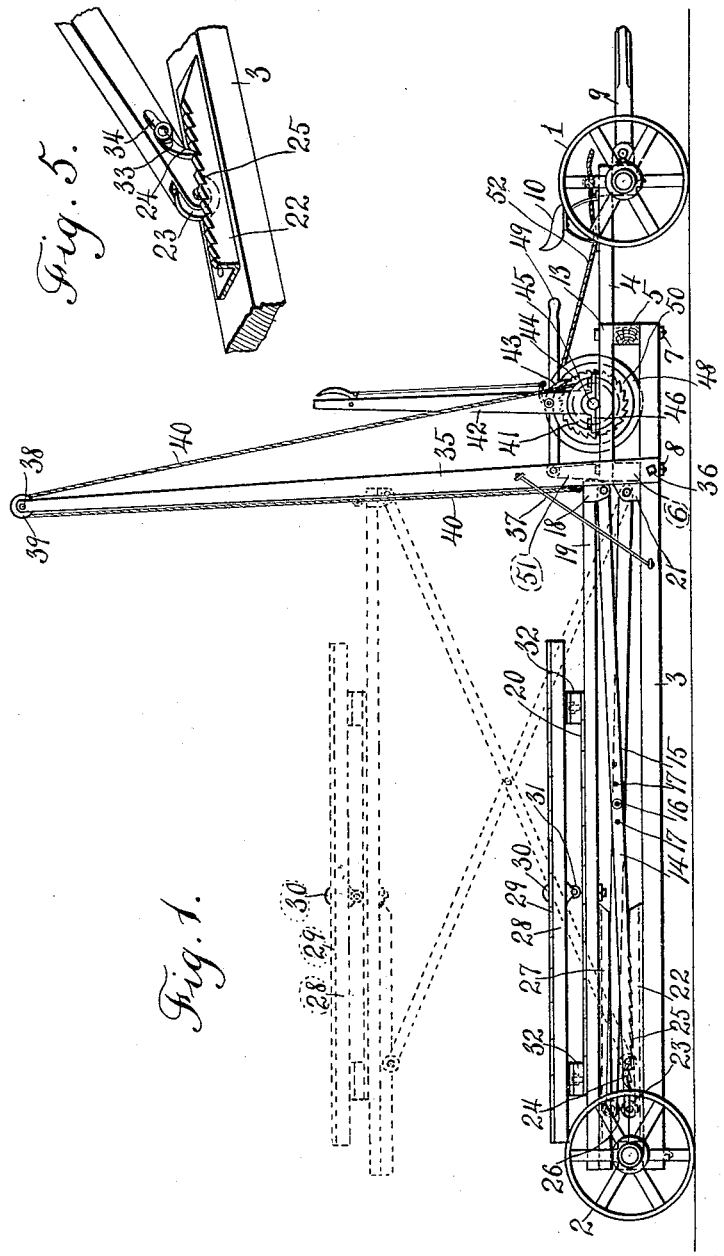

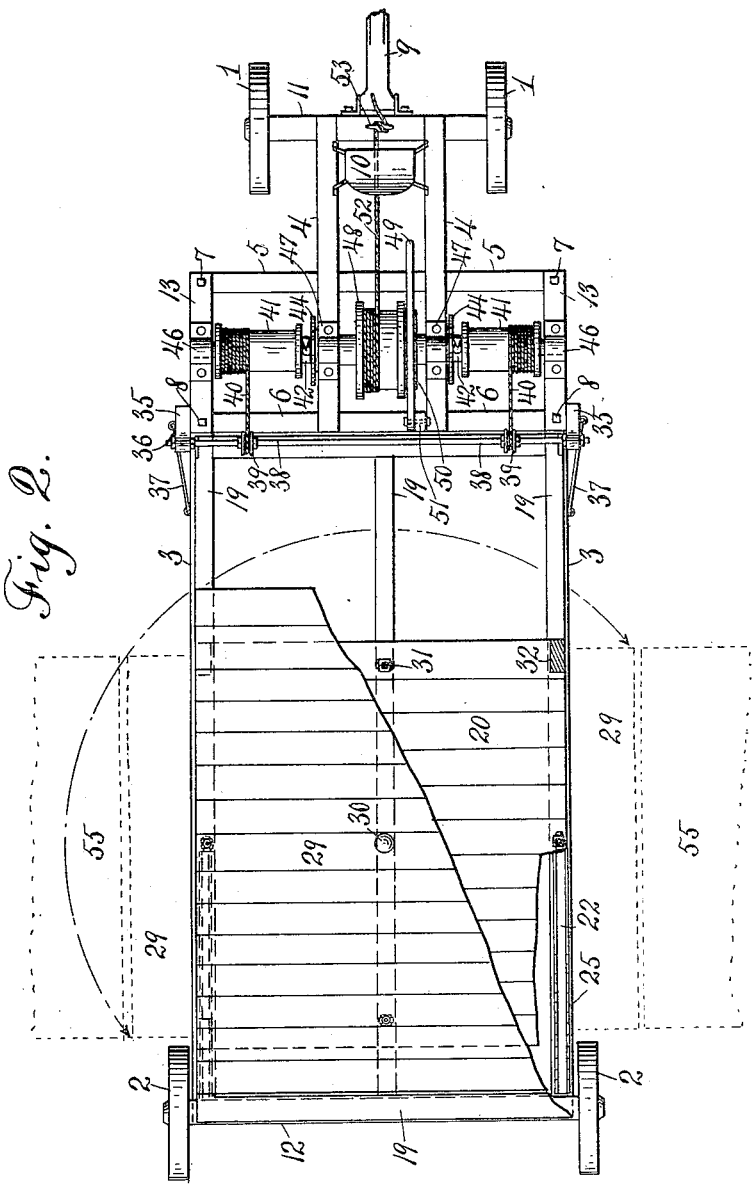

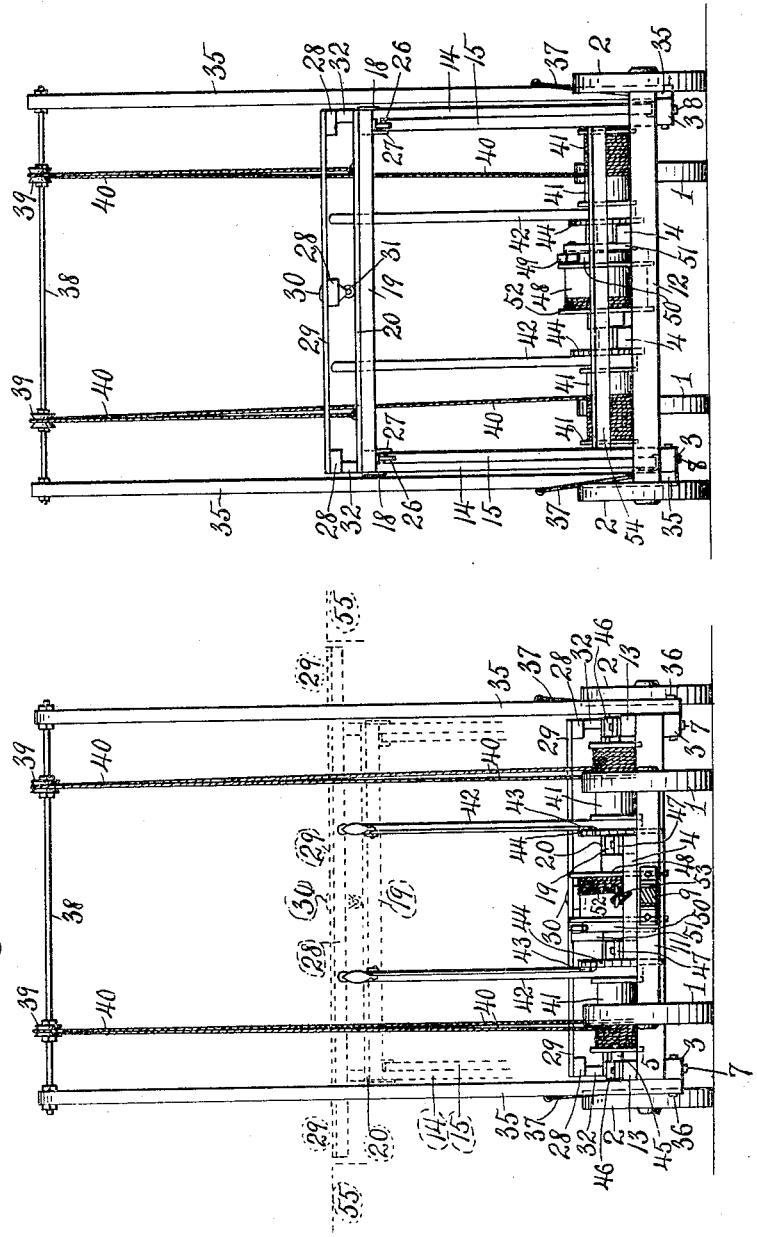

GEORGE R. RIKERT, OF CLAY CENTER, KANSAS.

WAGON-HOIST.

1,128,626.  Specification of Letters Patent.  Patented Feb. 16, 1915.

Application filed February 4, 1913. Serial No. 746,233.

*To all whom it may concern:*

Be it known that I, GEORGE R. RIKERT, a citizen of the United States, residing at Clay Center, in the county of Clay and State of Kansas, have invented certain new and useful Improvements in Wagon-Hoists, of which the following is a specification.

My invention relates to improvements in wagon elevators or hoists, mounted on a portable truck and operated by hand or other motive power and the objects of my improvements are to provide an elevator easily and simply constructed and operated and which may be adjusted laterally and longitudinally as desired or used as a stationary elevator without a truck. I attain these objects by means of the mechanism illustrated in the accompanying drawings in which—

Figure 1 is a side elevation collapsed, with dotted lines illustrating the position of the platform and standards when elevated; Fig. 2 is a plan view of same; Fig. 3, a front elevation of same; Fig. 4, a rear elevation thereof and Fig. 5, a detail view of the locking mechanism by means of which the platform is automatically held at the desired elevation.

Similar numerals of reference indicate like parts throughout the several views.

1 are the front wheels; 2, the rear wheels; 3, the side frames with front extensions 13 connected by cross-bars 5 and 6 secured thereto by bolts 7 and 8. To such cross-bars are secured forwardly extending bars 4 connecting, by a cross-bar and king-bolt, with the front axle 11. Side rails 3 are secured to rear axle 12. These together comprise the truck frame, which is provided with a tongue 9 and driver's seat 10.

Pivotally secured by bolt 36 to the forward end of the side-frames 3 are jibs 35 steadied by pliable cables 37. To the top of the side-frames and between the base of said jibs are pivotally secured levers or braces 15 pivoted to which at 16 are similar levers or braces 14 which are hinged to the forward end of the platform frame 19 in bracket 18. The lower ends of levers 15 are pivoted in brackets 21 secured to side-frames 3 near the base of jibs 35. Cross-brace 54 connecting the lower ends of levers 15 and a similar brace connecting the upper ends of levers 14 serve to prevent spreading or contraction of such levers. Each of the levers 15 at its opposite end is provided with an anti-friction roller 26, traveling on the underside of plate 27 secured to the rear end of the platform frame 19. The opposite ends of levers 14 are also provided with anti-friction rollers 23 which travel in tracks 22 near the rear end of side-frames 3. The frame 19 is provided with a platform 20 which is surmounted by a movable platform frame 28 to which it is connected by a pivot-bolt 30; such movable frame being provided with a platform 29. The plate 22 is provided with a vertical flange having ratchet teeth 25 which are engaged by pawls 24, secured to the levers 14 by pivot pin 33 and provided with a forwardly extending hand-lever 34. Leveling blocks 32 are secured near the ends of platform 20 and casters 31 secured to the underside of frame 28 at opposite sides thereof and travel on platform 20.

The cable 40 is secured to the forward end of the platform frame 19, passes over the sheaves 39 secured to the cross-bars 38 journaled in the top of jibs 35, said cables then passing downward to windlasses 41 secured to journal 45 having its bearings on the frame composed of parts 4, 5, 6 and 13 heretofore described. Cap plates 46 and 47 cover such journal bearings. The windlass 48, secured to said journal within the middle section of such frame, is provided with a cable 52 which extends forward to be connected to the power utilized for the purpose of operating the machine or belayed to pin 53 to hold the platforms in an elevated position. A crank attached to one end of said journal, a capstan, a wormgear or any other suitable means may, of course, be employed for raising and lowering such platforms.

The brake 49, pivotally secured to a block 51 secured to the cross-piece 6, is in a position to allow of said brake being frictionally applied to projection 50 of windlass 48. Hand levers 42 provided with pawls 43 which engage ratchet wheels 44 secured to journal 45 may be used alternately in raising or lowering said platforms by hand power.

When bolts 16 connect levers 14 and 15 midway between the ends thereof the platforms will be raised on a level and when bolts 16 connect such levers at other of the adjusting holes 17 provided for the purpose, such platforms will tilt as raised and thereby assist in discharging the load thereon.

To raise the platforms power is applied to the hand levers, moving them alternately or to cable 52 thereby revolving windlass 48 and causing windlasses 41 to turn and take up cables 40 which first raises the jibs 35 to an erect position and then gradually draws upward the platforms 20 and 29 to the desired height. If it be desired to load or unload to one side, the platform 29 may be revolved on its casters 31 to a position crosswise of platform 20. An approach 55 may be provided to meet such platform 29 when so swung around, as shown by dotted lines in Fig. 2.

The advantages of my hoist are:—that it is portable; that it is collapsible for convenience in moving from place to place; that it is of such construction that it may be, both in size and arrangement, adapted to numerous purposes, such as warehouse or depot trucks, elevating wagons loaded with grain or other substance and dumping the contents in a bin, car or other receptacle in town, on the farm or elsewhere; that it may be operated by hand, animal or other power as may be most convenient or best adapted to the purpose of the particular machine.

Having thus described my invention what I claim as new and desire to secure by Letters Patent is,—

1. A hoisting apparatus comprising a base and a platform, pivotally connected supporting braces hinged to one end of the platform and traveling on the base, similar braces hinged to the base and traveling on the underside of such platform near the end thereof opposite to that to which such first mentioned braces are hinged; jibs secured to the base; said jibs being provided with sheaves; cables secured to such platform, passing over said sheaves, and means for raising and lowering such platform by means of such cables.

2. A hoisting apparatus comprising a platform and a truck frame, pivotally connected supporting braces hinged to one end of the platform and traveling on the truck frame, similar braces hinged to such truck frame and traveling on the underside of such platform near the end thereof opposite to that to which such first mentioned braces are hinged; jibs secured to such truck frame, said jibs being provided with sheaves; cables secured to such platform, said cables passing over the sheaves, and means for operating the cables to raise or lower the platform.

3. A hoisting apparatus comprising a base and a platform, pivotally connected supporting braces hinged to one end of the platform and traveling on the base, similar braces hinged to the base and traveling on the underside of such platform near the end thereof opposite to that to which such first mentioned braces are hinged; jibs pivotally secured to the base; means for raising such jibs from an approximately horizontal position to an approximately vertical position said means also serving to raise such platform as and for the purpose set forth.

4. A hoisting apparatus comprising a platform and a base, pivotally connected supporting braces hinged to one end of the platform and traveling on the base, similar braces hinged to the base and traveling on the underside of such platform near the end thereof opposite to that to which such first mentioned braces are hinged, a platform pivotally surmounting the first named platform, whereby such pivoted platform may be held in a horizontal position while being swung on its pivot, and means for raising such platforms, as and for the purpose set forth.

5. A hoisting apparatus comprising a base and a platform, a pair of braces pivotally connected at one of their ends to one end of the platform, and having their free ends movable longitudinally of the base, a second pair of braces pivotally connected at one of their ends to the base, and having their other ends slidably engaged with the platform, the braces of each pair being adjustably connected intermediate their ends, and means for raising or lowering the platform.

6. A hoisting apparatus comprising a truck frame, ratchet plates carried by the truck frame, a platform, a pair of braces having one of their ends hingedly connected to the forward end of the platform, a second pair of braces pivotally connected to the first named braces, and having one of their ends pivotally connected to the truck frame, the other ends of said braces being slidably engaged with the platform, means for raising and lowering the platform, and pawls carried by the free ends of the first named braces for engaging the ratchet plates to hold the platform in different adjusted positions.

GEORGE R. RIKERT.

Witnesses:
ANTHONY DRANTMAN,
LYDIA E. KRAETTLI.

Copies of this patent may be obtained for five cents each, by addressing the "Commissioner of Patents, Washington, D. C."